Patented Feb. 18, 1947

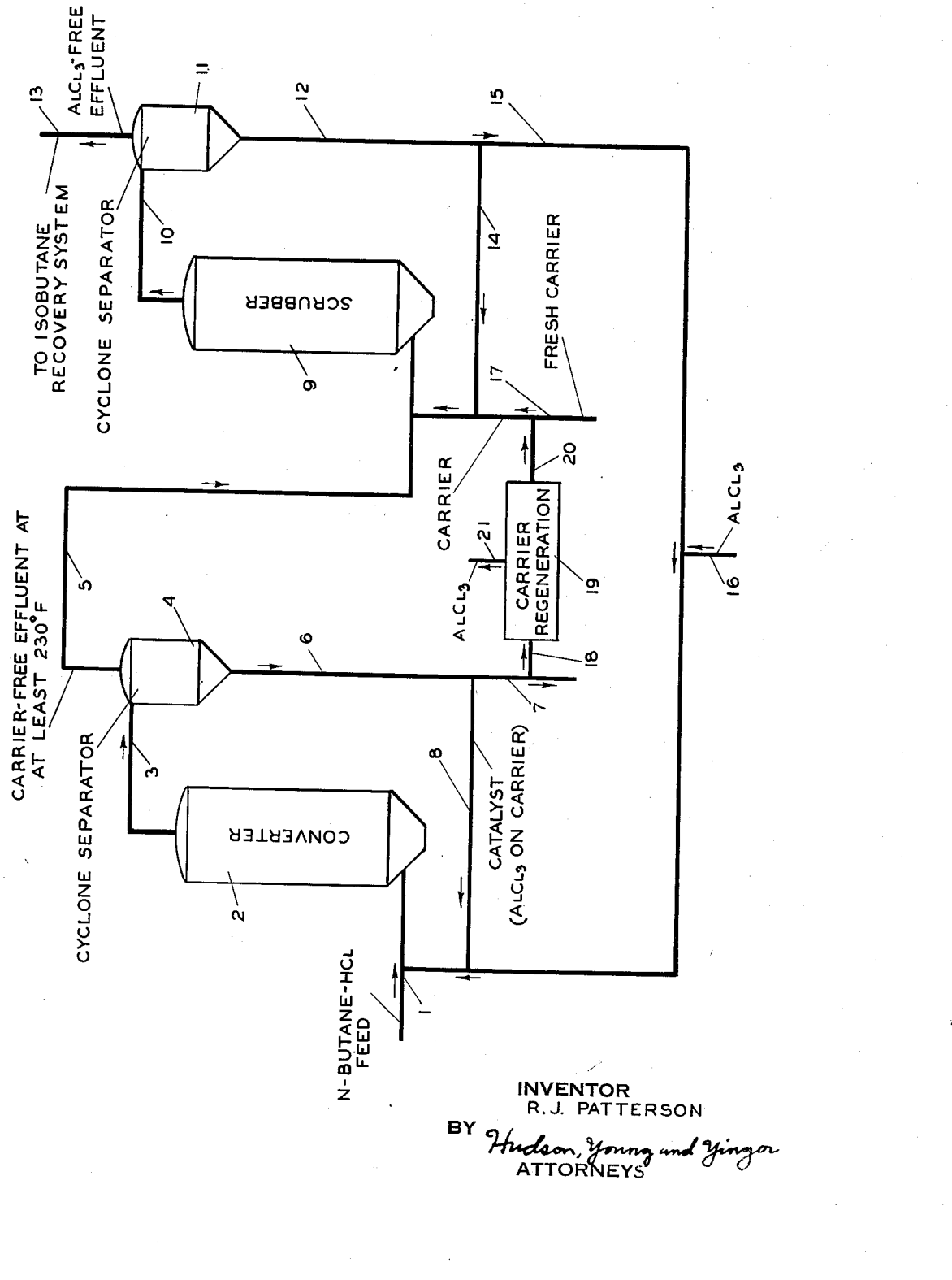

2,416,019

UNITED STATES PATENT OFFICE 2,416,019

ISOMERIZATION OF NORMAL BUTANE

Robert J. Patterson, Bartlesville, Okla., assignor to Phillips Petroleum Company, a corporation of Delaware Application February 8, 1944, Serial No. 521,557

6 Claims. (Cl. 260—683.5)

This invention relates to the isomerization of normal butane to isobutane by means of anhydrous aluminum chloride in the presence of hydrogen chloride as a promoter. Prior processes of this general type for the isomerization of normal butane to isobutane have involved numerous disadvantages, among which is the formation of sludge which is highly corrosive, represents a great loss of valuable aluminum chloride and must be removed from the system and disposed of. The disposal of this sludge is a difficult matter. Moreover, the prior processes have involved excessive corrosion when ordinary carbon steel equipment is used for the reaction. As a result it was necessary to employ corrosion resistant construction which is expensive and inconvenient. Another disadvantage of prior processes, especially those conducted in the vapor phase, is that the vaporous effluent carries aluminum chloride in volatilized form which causes difficulty within succeeding steps of the process, such as fractionation and the like. This volatilized aluminum chloride appears in subsequent units of equipment and causes plugging and other difficulties.

The principal object of the present invention is to eliminate the foregoing difficulties in isomerization of normal butane. Another object is to provide an isomerization process in which the reaction proper is conducted in an improved manner.

Another object is to provide for the removal of volatilized aluminum chloride from the vaporous effluent of a process of the foregoing type. Another object is to recover such volatilized aluminum chloride in unchanged form without allowing the temperature to drop to a point at which difficulties due to sludge formation, corrosion, and solidification in equipment are encountered. Another object is to provide a process of the foregoing type wherein the aluminum chloride so recovered is adapted for use directly in the reaction proper. Another object is to completely eliminate aluminum chloride from the effluent passed to the usual recovery system wherein the product isobutane, recycle hydrogen chloride, and recycle normal butane are separated. Numerous other objects will hereinafter appear.

The accompanying drawing portrays diagrammatically one arrangement of equipment suitable for carrying out the present invention.

I have found that normal butane may be converted to isobutane in a markedly improved manner by subjecting a feed of normal butane and hydrogen chloride in vapor phase and at a temperature of at least 230° F. to the action of a catalyst consisting of aluminum chloride supported on a finely divided adsorptive carrier, which catalyst is suspended in the vaporous reactants for a period of time sufficient to effect the desired reaction, separating the catalyst from said vapors and scrubbing the resulting vapors at a temperature of at least 230° F. by suspension therein of carrier containing no or only very little aluminum chloride for a sufficient period of time to remove the volatilized aluminum chloride contained in the effluents, separating the carrier and adsorbed aluminum chloride and recycling the resulting supported aluminum chloride, with or without reinforcement with additional aluminum chloride, to the reaction chamber. The scrubbed effluent is thus completely freed from aluminum chloride and may be passed to the usual recovery system for the separation of hydrogen chloride, isobutane, and normal butane without the disadvantages attending the normal presence of aluminum chloride in the effluent.

As the carrier used for supporting the aluminum chloride in the reaction step and in scrubbing the reaction effluent, I may use any suitable adsorptive material, resistance to and unreactive with the compounds present and usually mineral, such as bauxite, the commercial material known as "Porocel", which is a form of calcined bauxite now well known in the trade, activated alumina, activated clay, or any other material having equivalent properties. This carrier is preferably extremely finely divided, so that it is capable of being suspended in the vaporous material being converted or scrubbed. Particle sizes of the order used in so-called "fluid" catalyst hydrocarbon conversion processes are employed. Usually the carrier particle ranges from about 20 to about 200 microns in size and particles of from about 100 to about 400 mesh are suitable. The gaseous material is passed through the zones at a velocity sufficient to maintain the particles in suspension and at a rate which will give the desired contact time. In vertical chambers, which are ordinarily employed for conducting the reaction and the scrubbing, a gas velocity ranging from 1 to 10 feet per second may be employed, the lower velocities being utilized for the more finely divided particles and the higher velocities for heavier particles. The use of more finely divided particles permits shorter contact times and shorter reaction and scrubbing zones, while larger particles and higher gas velocities will require somewhat longer contact time and more elongated treating zones or recycle of suspension.

The usual mode of operation is to pass the vaporous material to be reacted or scrubbed and the catalyst or carrier into the bottom of a vertical elongated contacting chamber, remove from the top of said chamber the resulting suspension and pass the same to a cyclone separator where the solid carrier is separated from the gaseous stream and is conveyed back into the bottom of the chamber in any suitable manner as by means of gravity or by conveyor means, and withdraw from the top of the separator the treated gaseous stream.

An important feature of the present invention is the maintenance of the temperature in all parts of the apparatus where aluminum chloride is present at at least 230° F. This prevents sludge formation. It is believed that the presence of the adsorptive carrier contributes in preventing sludge formation although it is not desired to be restricted to any theory in this regard. It has been noted, however, that no separate sludge phase forms if the temperature be maintained at at least 230° F. in the presence of an adsorptive carrier of the type described above.

Referring to the accompanying drawing, a feed of normal butane and anhydrous hydrogen chloride enters via line 1 and passes in admixture with catalyst consisting of aluminum chloride supported on a finely divided carrier into fluid catalyst converter 2 where it is subjected to conditions effecting conversion of normal butane to isobutane. The effluent mixture leaves the top of converter 2 via line 3 and passes to cyclone separator 4 where the gaseous phase free from carrier is separated and taken off via line 5. The temperature in converter 2, line 3, separator 4, and line 5 is maintained at at least 230° F. Line 5 is as short as possible and may be lagged to prevent cooling. The catalyst separated in unit 4 is removed via line 6 and, after withdrawal of a suitable portion thereof via line 7, returned by any suitable means indicated by line 8 to the bottom of converter 2 for reuse. The procedure described takes place continuously, the catalyst being used over and over again. The carrier-free effluent is passed directly to the bottom of contacting unit 9 which operates in identically the same manner as converter 2. However, the finely divided carrier contacted with the effluent gases in scrubbing unit 9 carries either no or very little aluminum chloride so that the action in unit 9 is to completely free the gaseous effluent from aluminum chloride, this result being due to the action of the carrier in adsorbing the aluminum chloride. The carrier used in unit 9 is characterized by having an aluminum chloride content less than 3% by weight and preferably not over 1% by weight. It is maintained at below this figure in order to insure that the scrubbed effluent be completely free from aluminum chloride. Should the aluminum chloride content of the carrier in this portion of the apparatus be allowed to reach 3% or exceed this figure, traces of aluminum chloride will appear in the effluent. It will be understood that after operation is established the carrier will attain a definite equilibrium content somewhat below 3%. The lower this equilibrium figure the more certainly every trace of aluminum chloride is removed from the effluent. The mixture of carrier and gases attaining the top of scrubber 9 leaves via line 10, and passes directly to cyclone separator 11 where, as before, the solid suspended carrier is separated via line 12 from the aluminum chloride-free effluent which leaves via line 13 and passes to the recovery system which is of conventional type.

The scrubbing system is maintained at a temperature of at least 230° F. in order to prevent sludge formation, corrosion, and excessive difficulties with plugging. The separated carrier is recycled from line 12 by means of line 14, a portion thereof being removed continuously via line 15 and passed to the converter 2, usually after fortification or reinforcement by means of fresh aluminum chloride introduced in any suitable manner indicated by line 16, the purpose of this reinforcement being to bring the concentration of the aluminum chloride on the carrier from less than 3% up to the figure required for satisfactory isomerization in reactor 2. Usually this figure will be in the neighborhood of 20 weight per cent of aluminum chloride, although it may range from 10% to 40%; the upper limit depending upon the adsorptive capacity of the carrier at the temperature employed. If desired, fresh carrier may be introduced to the scrubbing unit by means of line 17. Usually, the amount of fresh carrier so introduced is kept to a minimum by regenerating at least a portion of the carrier contained in the withdrawal at line 7. As shown, a portion or all of this withdrawal may be passed via line 18 to a carrier regeneration unit 19 of any suitable type, the regenerated carrier being fed via line 20 to the scrubbing unit 9. A very satisfactory way of effecting this reclamation of carrier is to heat the same in a non-oxidizing atmosphere causing aluminum chloride to be driven off as indicated via line 21. This aluminum chloride may be recovered and purified for reuse by introduction into line 16. Methods of recovering and purifying aluminum chloride are well known to the art and need not be described here. If desired, the carrier, which has been heated to drive off substantially all of its aluminum chloride content, may be subjected to action to burn off any carbonaceous deposits which have accumulated thereon. Ordinarily, however, this will not be necessary. It will be understood that complete removal of aluminum chloride in unit 19 is not essential, it merely being necessary that sufficient aluminum chloride be removed to lower the aluminum chloride content of the carrier to a figure necessary for satisfactory operation of scrubber 9.

The lower limit of temperature in the conversion and scrubbing steps of the present invention is 230° F. Usually this temperature will not exceed about 450° F. More commonly, it will be in the neighborhood of 230–300° F. The pressure in the system may vary from about 200 pounds p. s. i. absolute upwardly to any desired figure which will allow the reactants to remain in vapor phase at the temperature employed. Where a temperature of 230–300° F. is employed, the pressure will usually range from about 200 to 450 pounds p. s. i. absolute.

It will be understood that if desired the equipment may be lagged with heat insulation to prevent dropping of the temperature below the desired level. Lagging of the conduits, cyclone separators and means for returning the separated carrier or catalyst to the scrubbing tower or conversion tower respectively may be desirable.

The temperature in all parts of the equipment is sufficiently high to prevent sludge formation wherever aluminum chloride and hydrocarbon are present together, that is at least 230° F. It may range thereabove to any desired figure. Ordinarily it is kept well below the subliming or boiling point of aluminum chloride at the particular pressure employed, in order to minimize volatilization of aluminum chloride. However the present invention may be applied to conversions carried out at temperatures above the subliming or boiling point of the aluminum chloride. In such case it is ordinarily preferred to drop the temperature of the effluent to some point below the subliming or boiling point of the aluminum chloride but still at least 230° F. before or in the scrubbing step in order to condense out much of the vaporized aluminum chloride into suspended solid form or onto the carrier particles used in the "fluid" scrubbing step.

Thus, it will be seen that the present invention in its broader aspects involves the scrubbing with "fluid" carrier at a temperature of at least 230° F. of a vaporous n-butane isomerization effluent containing volatilized aluminum chloride, said carrier containing less than 3 per cent and preferably not over 1 per cent of aluminum chloride, and thereby removing all of the aluminum chloride from the effluent. The presence of suspended aluminum chloride particles in the vaporous effluent is not precluded since these are removed by the carrier particles.

The fortification of the carrier withdrawn from the scrubbing system with additional aluminum chloride to bring its content thereof up to a figure suitable for use as a catalyst in the converter may be done in any suitable or known manner, for example by vaporizing aluminum chloride and subliming the vapors onto the carrier. Such a method is disclosed in the copending application of A. L. Foster, Serial No. 441,838, filed May 5, 1942, now U. S. Patent 2,395,263, and in U. S. patents to Thomas et al. 2,311,713 and Hancock 2,316,954.

The following non-limiting example illustrates the practice of the present invention.

*Example*

A feed of normal butane in admixture with 4 weight per cent of anhydrous HCl was fed at the rate of 1,375 barrels of normal butane per day into a system essentially as shown in the drawing. In fluid catalyst converter 2 the reactants were contacted with "Porocel" impregnated with 20 weight per cent of aluminum chloride, the ratio of catalyst to $C_4$ hydrocarbons being 1.2 to 1. The contact time was 65 seconds. The pressure was 250 pounds per square inch absolute and the temperature was 240° F. Forty per cent conversion of normal butane to isobutane was obtained. The hot vaporous effluent separated in the cyclone separator 4 was passed immediately and without cooling into a fluid carrier scrubber 9 as shown in the drawing. The carry-over of aluminum chloride in the vaporous effluent in line 5 was 80 pounds per day. The effluent was scrubbed with "Porocel" containing 1% by weight of aluminum chloride in the scrubbing system represented by units 9 and 11 and the accessory lines. The minimum temperature in the scrubbing system was 230° F. The scrubbed effluent removed via line 13 was free from detectable quantities of aluminum chloride. The carrier was withdrawn via line 15 and in such amounts as to maintain the aluminum chloride content at about 1% in the scrubbing system. This withdrawal was reinforced with sufficient aluminum chloride to bring its content thereof up to the figure maintained in converter 2 and recycled thereto.

From the foregoing it will be seen that the present invention presents numerous advantages over previous isomerization practices. Chief among these is the fact that sludge formation with its attendant corrosion and erosion of metallic equipment, valves, and the like is eliminated. Furthermore, the process provides a simple and economical means of converting normal butane to isobutane. The process is exceedingly flexible and reaction and scrubbing conditions may be varied within wide limits, depending upon the wishes of the operator. The effluent is completely free from aluminum chloride, so that it can be fractionated and otherwise treated for recovery without the objectionable presence of aluminum chloride. The aluminum chloride contained in the vaporous effluent leaving the reaction zone is completely removed in unchanged form suitable for direct recycling to the reaction zone and without allowing the temperature wherever aluminum chloride is present to drop below 230° F. Numerous other advantages of the process of the present invention will be apparent to those skilled in the art.

It is sometimes preferred to begin the operation of isomerization unit 2 at a temperature of 230-240° F. under which conditions 35-40% conversion of normal butane to isobutane is obtained with fresh catalyst, and as the catalyst spends, to raise the conversion temperature as necessary to maintain about 40% conversion. The catalyst may be considered spent when a temperature of 300° F. is necessary to obtain the desired conversion. Above 300° F. the amount of pentanes and heavier materials formed increases to an undesirable extent. By continuously withdrawing and regenerating the proper proportion of catalyst, constant conversion at constant temperature is obtained after equilibrium or steady state operation has been attained.

I claim:

1. The process of isomerizing normal butane to isobutane which comprises suspending a finely divided solid catalyst consisting of aluminum chloride deposited on a finely divided adsorptive mineral carrier containing from 10 to 40% by weight of aluminum chloride in a vaporous stream of normal butane and a promoter of hydrogen chloride, moving the resulting suspension from the bottom to the top of a vertical isomerization zone under conditions and during a period of time such as to effect isomerization of the normal butane to isobutane, removing the resulting suspension from the top of said zone as it attains same, passing the so removed suspension into a separate and distinct separating zone and there completely separating the catalyst particles from the vaporous effluent of isobutane, unconverted normal butane together with volatilized aluminum chloride, and hydrogen chloride, recycling a portion of the separated catalyst to said suspending step and thereby to said isomerization zone, treating another portion of said separated catalyst to recover the carrier content thereof free of aluminum chloride, suspending finely divided adsorptive mineral carrier containing not over 1% by weight of aluminum chloride including the carrier recovered in said last-named step and recycled carrier from the scrubbing step hereinafter described in a stream of said vaporous effluent and moving the resulting suspension from the bottom to the top of a vertical scrubbing zone under conditions and during a period of time such as to effect adsorption of all of the volatilized aluminum chloride from said vaporous effluent onto the suspended carrier, removing the resulting suspension from the top of said scrubbing zone as it attains same, passing the so removed suspension into a second separate and distinct separating zone and there completely separating carrier particles from the vaporous aluminum chloride-free effluent of isobutane, normal butane and hydrogen chloride, recycling a portion of the separated carrier to said last-named suspending step and thereby to said scrubbing zone, fortifying the balance of the separated carrier with sufficient additional aluminum chloride to bring the content thereof up to that of the catalyst employed in the isomerization zone and passing the so-fortified carrier to said first-named suspending step and thereby to said isomerization zone as catalyst therefor, the temperature in all portions of the system where aluminum chloride and hydrocarbon are present together being maintained at at least 230° F.

2. A process for the isomerization of a butane which comprises suspending a finely divided solid catalyst consisting of aluminum chloride deposited on a finely divided adsorptive mineral carrier containing from 10 to 40% by weight of aluminum chloride in a vaporous stream of a butane and a promoter of hydrogen chloride, moving the resulting suspension from the bottom to the top of a vertical isomerization zone under conditions and during a period of time such as to effect isomerization of the butane to an isomer, removing the resulting suspension from the top of said zone as it attains same, passing the so-removed suspension into a separate and distinct separating zone and there completely separating the catalyst particles from the vaporous effluent of isomer, unconverted butane together with volatilized aluminum chloride, and hydrogen chloride, recycling a portion of the separated catalyst to said suspending step and thereby to said isomerization zone, treating another portion of said separated catalyst to recover the carrier content thereof substantially free of aluminum chloride, suspending finely divided adsorptive mineral carrier containing not over 1% by weight aluminum chloride including the carrier recovered in said last-named step and recycled carrier from the scrubbing step hereinafter described in a stream of said vaporous effluent and moving the resulting suspension from the bottom to the top of a vertical scrubbing zone under conditions and during a period of time such as to effect adsorption of substantially all of the volatilized aluminum chloride from said vaporous effluent onto the suspended carrier, removing the resulting suspension from the top of said scrubbing zone as it attains same, passing the so-removed suspension into a second separate and distinct separating zone and there completely separating carrier particles from the vaporous aluminum chloride-free effluent of isomer, butane and hydrogen chloride, recycling a portion of the separated carrier to said last-named suspending step and thereby to said scrubbing zone, fortifying the balance of the separated carrier with sufficient additional aluminum chloride to bring the content thereof up to that of the catalyst employed in the isomerization zone, and passing the so-fortified carrier to said first-named suspending step and thereby to said isomerization zone as catalyst therefor, the temperature in all portions of the system where aluminum chloride and hydrocarbon are present together being maintained at at least 230° F.

3. A process for the isomerization of a butane which comprises suspending a finely divided solid catalyst consisting of aluminum chloride deposited on a finely divided adsorptive mineral carrier containing from 10 to 40% by weight of aluminum chloride in a vaporous stream of a butane and a promoter of hydrogen chloride, moving the resulting suspension from the bottom to the top of a vertical isomerization zone under conditions and during a period of time such as to effect isomerization of the butane to an isomer, removing the resulting suspension from the top of said zone as it attains same, passing the so-removed suspension into a separate and distinct separating zone and there completely separating the catalyst particles from the vaporous effluent of isomer, unconverted butane together with volatilized aluminum chloride, and hydrogen chloride, recycling a portion of the separated catalyst to said suspending step and thereby to said isomerization zone, treating another portion of said separated catalyst to recover the carrier content thereof substantially free of aluminum chloride, suspending finely divided adsorptive mineral carrier containing not over 3% by weight aluminum chloride including the carrier recovered in said last-named step and recycled carrier from the scrubbing step hereinafter described in a stream of said vaporous effluent and moving the resulting suspension from the bottom to the top of a vertical scrubbing zone under conditions and during a period of time such as to effect adsorption of substantially all of the volatilized aluminum chloride from said vaporous effluent onto the suspended carrier, removing the resulting suspension from the top of said scrubbing zone as it attains same, passing the so-removed suspension into a second separate and distinct separating zone and there completely separating carrier particles from the vaporous aluminum chloride-free effluent of isomer, butane and hydrogen chloride, recycling a portion of the separated carrier to said last-named suspending step and thereby to said scrubbing zone, fortifying the balance of the separated carrier with sufficient additional aluminum chloride to bring the content thereof up to that of the catalyst employed in the isomerization zone, and passing the so-fortified carrier to said first-named suspending step and thereby to said isomerization zone as catalyst therefor.

4. The process of isomerizing normal butane to isobutane which comprises suspending a finely divided solid catalyst consisting of aluminum chloride deposited on a finely divided adsorptive mineral carrier containing from 10 to 40% by weight of aluminum chloride in a vaporous stream of normal butane and a promoter of hydrogen chloride, moving the resulting suspension from the bottom to the top of a vertical isomerization zone under conditions and during a period of time such as to effect isomerization of the normal butane to isobutane, removing the resulting suspension from the top of said zone as it attains same, passing the so-removed suspension into a separate and distinct separating zone and there completely separating the catalyst particles from the vaporous effluent of isobutane, unconverted normal butane together with volatilized aluminum chloride, and hydrogen chloride, recycling a portion of the separated catalyst to said suspending step and thereby to said isomerization zone, treating another portion of said separated catalyst to recover the carrier content thereof free of aluminum chloride, suspending finely divided adsorptive mineral carrier containing not over 1% by weight of aluminum chloride including the carrier recovered in said last-named step and recycled carrier from the scrubbing step hereinafter described in a stream of vaporous effluent and moving the resulting suspension from the bottom to the top of a vertical scrubbing zone under conditions and during a period of time such as to effect adsorption of all the volatilized aluminum chloride from said vaporous effluent onto the suspended carrier, removing the resulting suspension from the top of said scrubbing zone as it attains same, passing the so-removed suspension into a second separate and distinct separating zone and there completely separating carrier particles from the vaporous aluminum chloride-free effluent of isobutane, normal butane and hydrogen chloride, recycling a portion of the separated carrier to said last-named suspending step and thereby to said scrubbing zone, fortifying the balance of the separated carrier with sufficient additional aluminum chloride to bring the content thereof up to that of the catalyst employed in the isomerization zone, and passing the so-fortified carrier to said first-named suspending step and thereby to said isomerization zone as catalyst therefor.

5. A process for the isomerization of a butane which comprises suspending a finely divided solid catalyst consisting of aluminum chloride deposited on a finely divided adsorptive mineral carrier containing from 10 to 40% by weight of aluminum chloride in a vaporous stream of a butane and a promoter of hydrogen chloride, moving the resulting suspension through an isomerization zone under conditions and during a period of time such as to effect isomerization of the butane to an isomer, removing the resulting suspension from said zone, passing the so-removed suspension into a separate and distinct separating zone and there completely separating the catalyst particles from the vaporous effluent of isomer, unconverted butane together with volatilized aluminum chloride, and hydrogen chloride, recycling a portion of the separated catalyst to said suspending step and thereby to said isomerization zone, treating another portion of said separated catalyst to recover the carrier content thereof substantially free of aluminum chloride, suspending finely divided adsorptive mineral carrier containing not over 3% by weight of aluminum chloride including the carrier recovered in said last-named step and recycled carrier from the scrubbing step hereinafter described in a stream of said vaporous effluent and moving the resulting suspension through a scrubbing zone under conditions and during a period of time such as to effect adsorption of substantially all of the volatilized aluminum chloride from said vaporous effluent onto the suspended carrier, removing the resulting suspension from said scrubbing zone, passing the so-removed suspension into a second separate and distinct separating zone and there completely separating carrier particles from the vaporous aluminum chloride-free effluent of isomer, butane and hydrogen chloride, recycling a portion of the separated carrier to said last-named suspending step and thereby to said scrubbing zone fortifying the balance of the separated carrier with sufficient additional aluminum chloride to bring the content thereof up to that of the catalyst employed in the isomerization zone, and passing the so-fortified carrier to said first-named suspending step and thereby to said isomerization zone as catalyst therefor.

6. A process for the isomerization of a butane which comprises suspending a finely divided solid catalyst consisting of aluminum chloride deposited on a finely divided adsorptive mineral carrier in a vaporous stream of a butane, moving the resulting suspension through an isomerization zone under conditions and during a period of time such as to effect isomerization of the butane to an isomer, removing the resulting suspension from said zone, passing the so-removed suspension into a separate and distinct separating zone and there completely separating the catalyst particles from the vaporous effluent of isomer and unconverted butane together with volatilized aluminum chloride, recycling a portion of the separated catalyst to said suspending step and thereby to said isomerization zone, treating another portion of said separated catalyst to recover the carrier content thereof substantially free of aluminum chloride, suspending finely divided adsorptive mineral carrier including the carrier recovered in said last-named step and recycled carrier from the scrubbing step hereinafter described in a stream of said vaporous effluent and moving the resulting suspension through a scrubbing zone under conditions and during a period of time such as to effect adsorption of substantially all of the volatilized aluminum chloride from said vaporous effluent onto the suspended carrier, removing the resulting suspension from said scrubbing zone, passing the so-removed suspension into a second separate and distinct separating zone and there completely separating carrier particles from the vaporous aluminum chloride-free effluent of isomer, butane and hydrogen chloride, recycling a portion of the separated carrier to said last-named suspending step and thereby to said scrubbing zone, fortifying the balance of the separated carrier with sufficient additional aluminum chloride to bring the content thereof up to that of the catalyst employed in the isomerization zone, and passing the so-fortified carrier to said first-named suspending step and thereby to said isomerization zone as catalyst therefor.

ROBERT J. PATTERSON.

REFERENCES CITED

The following references are of record in the file of this patent:

UNITED STATES PATENTS

| Number | Name | Date |
|---|---|---|
| 2,281,924 | de Simo et al. (A) | May 5, 1942 |
| 2,339,685 | de Simo et al. (B) | Jan. 18, 1944 |
| 2,311,713 | Thomas et al. | Feb. 23, 1943 |
| 2,346,294 | Danforth | Apr. 11, 1944 |
| 2,323,830 | McMillan | July 6, 1943 |

FOREIGN PATENTS

| Number | Country | Date |
|---|---|---|
| 115,689 | International (Australian) | Aug. 20, 1942 |